A. J. SEITER.
ROLLER TRACTOR.
APPLICATION FILED JULY 2, 1920.
1,375,185. Patented Apr. 19, 1921.
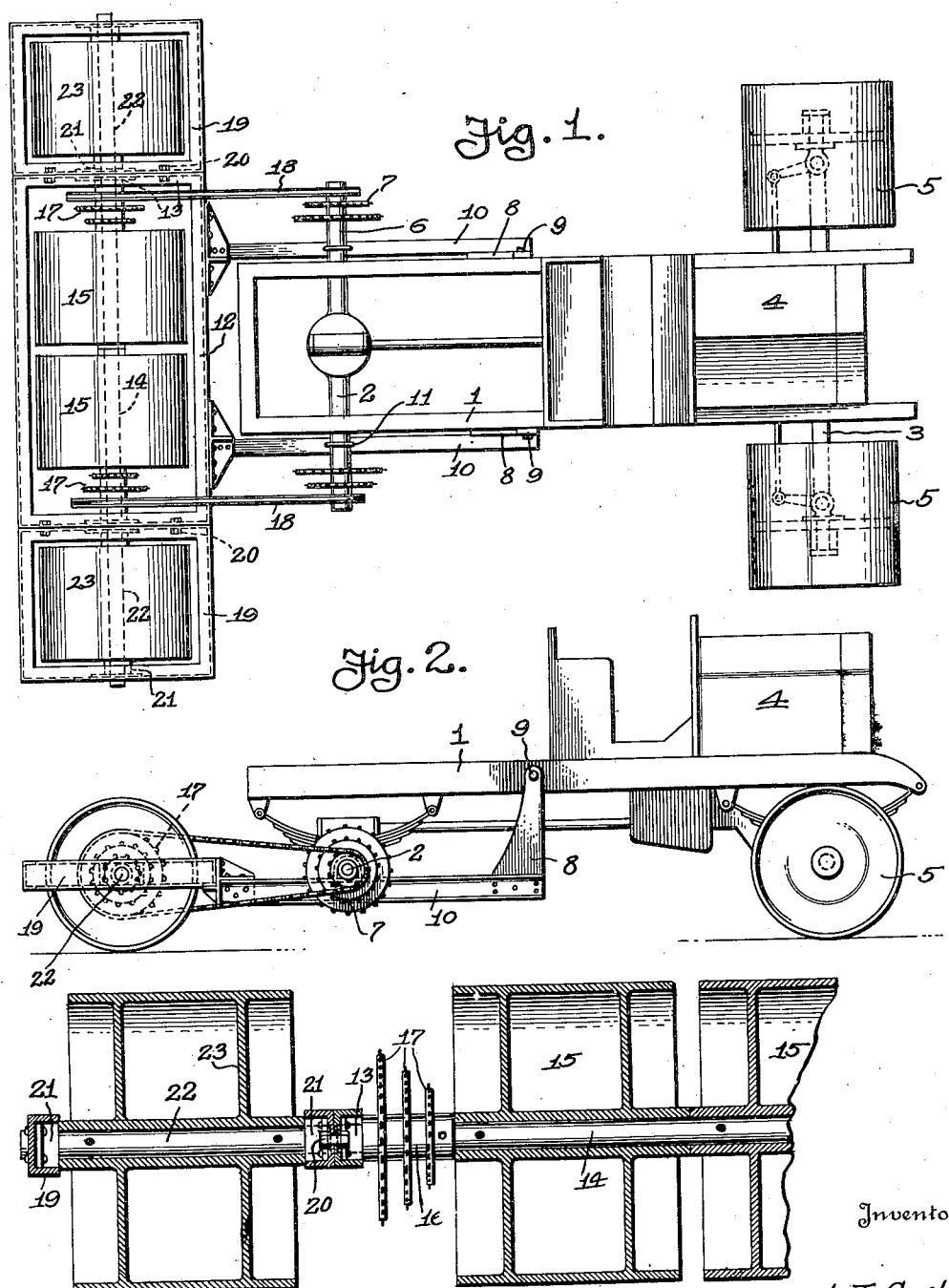

though a multiplicity of rollers may be placed in

UNITED STATES PATENT OFFICE.

ALBERT J. SEITER, OF PROSPECT, OHIO.

ROLLER-TRACTOR.

1,375,185.　　　　　Specification of Letters Patent.　　Patented Apr. 19, 1921.

Application filed July 2, 1920. Serial No. 393,559.

*To all whom it may concern:*

Be it known that I, ALBERT J. SEITER, a citizen of the United States of America, residing at Prospect, in the county of Marion and State of Ohio, have invented certain new and useful Improvements in Roller-Tractors, of which the following is a specification, reference being had therein to the accompanying drawings.

This invention relates to a roller-tractor and the primary object of my invention is to furnish a tractor with a plurality of transversely alining rear wheels that may be utilized as rollers for pulverizing and otherwise disintegrating the soil.

Another object of my invention is to provide a tractor having wheels affording large tractive power and such power of the tractor may be increased by additional wheels, so that the tractor may be used for road building or agricultural purposes.

A further object of my invention is to provide roller attachments by which a tractor may be converted into a roller implement by simply removing the gear wheels of the tractor and substituting therefor my roller attachment, and the roller attachment is designed so that its rolling surface may be increased or decreased, and also the speed changed to meet various requirements.

A still further object of my invention is to provide a power driven roller or pulverizer wherein the parts are constructed with a view of reducing the cost of manufacture and at the same time retain those features by which safety, durability and ease of assembling are secured. With such ends in view, my invention resides in the novel construction, to be hereinafter described and then claimed, and reference will now be had to the drawing, wherein—

Figure 1 is a plan of a roller tractor;

Fig. 2 is a side elevation of the same; and

Fig. 3 is a longitudinal sectional view of the roller attachment.

In the drawing, the reference numeral 1 denotes a tractor chassis having a rear axle assembly 2, a front axle assembly 3, a power plant 4, and such accessories as are common to a power driven tractor.

The front axle assembly 3 may include wheels 5 of greater width or tractive power than the usual wheels of a tractor, so that the front wheels of the tractor will possess rolling qualifications as well as permitting of the tractor being operated over soft ground.

The rear axle assembly 2 ordinarily includes rear wheels, but such wheels are dispensed with and in place of the wheels there are hubs 6 having change speed wheels 7, which may be in the form of sprocket wheels. In some instances the sprocket wheels 7 may be mounted direct on the end of the driven axle which ordinarily forms part of the rear axle assembly 2, but in actual practice I find it better to provide a special hub for the change speed wheels so that the same may be bodily removed when the usual rear tractor wheels are to be substituted therefor.

The rear end of the chassis is supported by a sub-frame comprising hangers 8 pivotally connected to the sides of the chassis 1, in advance of the rear axle assembly 2 and any suitable pivotal means, as indicated at 9, may be employed for supporting the hangers 8. Attached to the lower end of the hangers 8 are longitudinal side members 10 and these members are held below the rear axle assembly by U-bolts 11 or other fastening means coupling such side members to the rear axle assembly. The rear ends of the side members 10 are rigidly connected to an oblong main roller frame 12, preferably made of channel structural steel. In the ends of the frame 12 are suitable bearings 13 for a rear axle 14 and mounted on said axle are large rollers 15 and hubs 16 of change speed wheels 17. The change speed wheels 17 are in longitudinal alinement with the wheels 7 and endless power transmission members 18, as sprocket chains, may be trained about the wheels 7 and 17 so that the rear axle 14 may be driven at a desired speed relative to the power plant 4 of the tractor.

The rollers 15 are preferably two in number, although a multiplicity of rollers may be placed in the frame 12 or a single long roller, and in either instance the rollers 15 serve as the rear driven wheel of the tractor and are of sufficient width to prevent excessive lateral tilting of the tractor when moving over rough or irregular ground.

When it is desired to increase the rolling or tractive properties of the machine, the ends of the frame 12 are provided with auxiliary frames 19 which are bolted or otherwise connected, as at 20, to the ends of the frame 12. In the auxiliary frames 19 are bearings 21 for auxiliary axles 22 and suitably mounted on said axles are rollers 23 corresponding in diameter to the rollers 15. The rollers 23 may be fixed on the axles 22 with said axles journaled in the bearings 21 or the axle 22 may be fixed in the bearings 21 and the rollers 23 loose on the axle.

By reference to Fig. 1 it will be observed that the main and auxiliary side frames coöperate in providing a wide rear end for the tractor and with all of the rollers 15 and 23 in use a wide strip of ground can be rolled and considerable time and labor saved by using the tractor for such purposes.

By propping up the rear end of the tractor chassis 1, the roller attachment may be removed and the hubs 6, whereby the usual wheels of the tractor may be placed in position to permit of the tractor being used for general purposes, and it is obvious that with the roller attachment in place the power transmission members 18 may be coupled to machinery whereby the tractor may be utilized as a stationary power plant for operating various kinds of machines about a farm.

It is thought that the utility of my roller tractor will be apparent without further description, and while in the drawing there is illustrated a preferred embodiment of my invention, it is to be understood that the structural elements are susceptible to such variations in size, shape and manner of assemblage, as fall within the scope of the appended claims.

What I claim is:—

1. In a roller-tractor combination, a tractor having a rear axle assembly devoid of wheels, a roller attachment pivotally connected to said tractor to support the rear end thereof and having a roller shaft receiving power from the rear axle assembly, and side roller units abutting the sides of the roller attachment and connected thereto, said side roller units having roller shafts coupled to the roller shaft of the roller attachment.

2. In a roller tractor combination, a tractor chassis having a rear axle assembly devoid of ground engaging wheels, a sub-frame having its forward end pivotally connected to the chassis and its intermediate portion attached to the rear axle assembly of said tractor so that said sub-frame is normally in a plane parallel to said tractor chassis, a roller supporting the rear end of said sub-frame, means transmitting power to said roller from the rear axle assembly of said tractor, and roller units coöperating with the driven roller in supporting said sub-frame with said roller units attached to the sides of said sub-frame and driven from the driven roller of said sub-frame.

In testimony whereof I affix my signature in the presence of two witnesses.

ALBERT J. SEITER.

Witnesses;
 MARIE GRIMES,
 E. R. DURFEE.